(12) United States Patent
Wang et al.

(10) Patent No.: US 11,290,577 B2
(45) Date of Patent: Mar. 29, 2022

(54) WIRELESS DATA TRANSMISSION

(71) Applicant: SEMICONDUCTOR COMPONENTS INDUSTRIES, LLC, Phoenix, AZ (US)

(72) Inventors: Huizhao Wang, San Jose, CA (US); Karthik Ramasubramanian, Santa Clara, CA (US); Denis Bykov, Fremont, CA (US); James Wood, Seaside, CA (US); Jun Jin, Shanghai (CN); Lin Fang, San Jose, CA (US); Hongping Liu, Milpitas, CA (US); Benjamin Mung, Shanghai (CN); Ping Lu, Shanghai (CN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 44 days.

(21) Appl. No.: 16/815,599

(22) Filed: Mar. 11, 2020

(65) Prior Publication Data

US 2021/0289059 A1    Sep. 16, 2021

(51) Int. Cl.
| | |
|---|---|
| *H04W 56/00* | (2009.01) |
| *H04L 69/166* | (2022.01) |
| *H04L 69/22* | (2022.01) |
| *H04L 69/04* | (2022.01) |
| *H04L 1/16* | (2006.01) |
| *H04W 72/04* | (2009.01) |
| *H04L 1/00* | (2006.01) |
| *H04W 28/06* | (2009.01) |

(52) U.S. Cl.
CPC .......... *H04L 69/166* (2013.01); *H04L 1/0061* (2013.01); *H04L 1/1607* (2013.01); *H04L 69/04* (2013.01); *H04L 69/22* (2013.01); *H04W 28/06* (2013.01); *H04W 72/0446* (2013.01)

(58) Field of Classification Search
CPC ... H04L 69/166; H04L 1/0061; H04L 1/1607; H04L 69/04; H04L 69/22; H04W 28/06; H04W 72/0446
USPC .......................................................... 370/329
See application file for complete search history.

(56) References Cited

U.S. PATENT DOCUMENTS

| | | | |
|---|---|---|---|
| 9,531,520 B2 | 12/2016 | Kwon et al. | |
| 9,912,513 B2 | 3/2018 | Kwon | |
| 2006/0062338 A1* | 3/2006 | Chua | H04L 7/005 375/372 |
| 2015/0052360 A1* | 2/2015 | Ravishankar | H04W 12/037 713/171 |
| 2016/0100421 A1* | 4/2016 | Ding | H04W 72/1268 370/336 |
| 2016/0242070 A1* | 8/2016 | Asterjadhi | H04L 1/1671 |

(Continued)

*Primary Examiner* — Sai Ming Chan
(74) *Attorney, Agent, or Firm* — Maschoff Brennan (57) ABSTRACT

An example method may include receiving, at a device, a first frame over a wireless network and constructing a preliminary data portion of a second frame. The second frame may be configured for transmission over the wireless network. The method may also include in response to the receiving of the first frame at the device, beginning transmission of a header portion of the second frame over the wireless network and after the beginning transmission of the header portion of the second frame, constructing, based on the preliminary data portion, a finalized data portion of the second frame for transmission over the wireless network.

20 Claims, 6 Drawing Sheets

(56) References Cited

U.S. PATENT DOCUMENTS

2017/0070914 A1\* 3/2017 Chun .................... H04W 28/10
2019/0174335 A1\* 6/2019 Djukic ...................... H04L 1/08

\* cited by examiner

| Header 310a | Data 312 | Data 314 | Data 316 |

| Header Info. 311 310b | Data 312 | Data 314 |

WIRELESS DATA TRANSMISSION

FIELD

The implementations discussed herein are related to a wireless data transmission.

BACKGROUND

Unless otherwise indicated herein, the materials described herein are not prior art to the claims in the present application and are not admitted to be prior art by inclusion in this section.

Wireless local area networks (WLAN) may be established using a device called a Wireless Access Point (WAP). The WAP may wirelessly couple all the devices of the local network, e.g. wireless stations such as digital devices to one another and to other networks. Most WAPs implement the IEEE 802.11 standard. The IEEE 802.11 standard includes multiple protocols. In some protocols, the WAP may transmit trigger frames that indicates which devices may transmit uplink data to the WAP. The trigger frames may also indicate when the devices may transmit the uplink data and the resources block of the WLAN to use when transmitting the uplink data.

The subject matter claimed herein is not limited to implementations that solve any disadvantages or that operate only in environments such as those described above. Rather, this background is only provided to illustrate one example technology area where some implementations described herein may be practiced.

SUMMARY

An example method may include receiving, at a device, a first frame over a wireless network and constructing a preliminary data portion of a second frame. The second frame may be configured for transmission over the wireless network. The method may also include in response to the receiving of the first frame at the device, beginning transmission of a header portion of the second frame over the wireless network and after the beginning transmission of the header portion of the second frame, constructing, based on the preliminary data portion, a finalized data portion of the second frame for transmission over the wireless network.

BRIEF DESCRIPTION OF THE DRAWINGS

Example implementations will be described and explained with additional specificity and detail using the accompanying drawings in which.

DETAILED DESCRIPTION OF SOME EXAMPLE IMPLEMENTATIONS

Implementations described herein may generally include an approach of wireless data transmission. In some wireless transmission protocols, a first device, such as a wireless access point, may transmit a request frame to one or more other devices. The request frame may indicate to the one or more other devices that the one or more other devices may transmit a response frame, with uplink data, to the first device. As an example, the request frame may be a trigger frame and the response frames may be a physical layer protocol data unit (PPDU) frame in the IEEE 802.11ax protocol.

Some wireless transmission protocols may specify a timing requirement for devices, such as the one or more other devices, to begin transmission of a response frame after receiving a request frame. The timing requirement may describe a particular amount of time after the reception of the request frame for the devices to begin transmission of a response frame. In these and other implementations, the particular amount of time may be less than an amount of time that the devices may use to construct a response frame if the devices wait for reception of the entire request frame before preparing the response frame. Implementations described in this disclosure may include various methods, systems, and/or devices that may be used to construct and transmit a response frame to adhere to a timing requirement specified by a wireless transmission protocol.

For example, in some implementations, a method is described that includes constructing a preliminary data portion of a response frame before a request frame is received. Alternately or additionally, the method may include obtaining information from the request frame before a cyclic redundancy check of the first frame is completed. The information may be used to begin construction of a header portion of the response before the request frame is completely received and verified. Alternately or additionally, the information may be used to determine a response time for transmitting the response frame before the request frame is completely received and verified.

The method may also include beginning transmission of the header portion of the response frame before the construction of a data portion of the response frame is completed. In these and other implementations, the data portion of the response frame may be completed before the transmission of the header portion of the response frame is completed. After transmission of the header portion of the response frame, the data portion of the completed response frame may be transmitted.

The implementations described in this disclosure may allow a device or system to adhere to timing requirements of wireless protocols when the device or system may not be configured to otherwise prepare a response frame to meet the timing requirements. Allowing a device or system to adhere to timing requirements of wireless protocols may allow the device or system to use the wireless protocol, which may reduce overall network traffic, decrease backlog and transmission delays, improve network speeds observed by consumers using wireless networks, and/or improve network functionality.

Reference will now be made to the drawings to describe various aspects of example implementations of the present disclosure. It is to be understood that the drawings are diagrammatic and schematic representations of such example implementations, and are not limiting of the present disclosure, nor are they necessarily drawn to scale.

Figure 1:
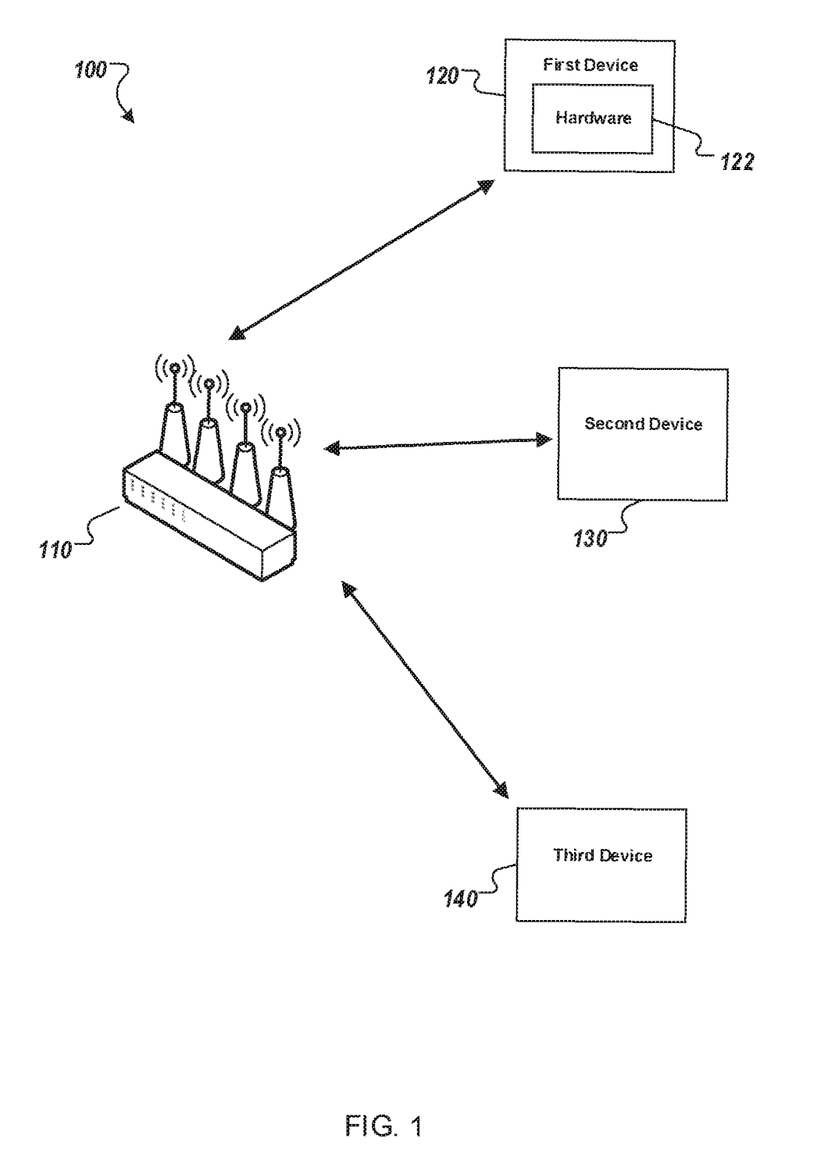
FIG. 1 illustrates an example environment within which wireless data may be transmitted.

FIG. 1 illustrates an example environment 100 within which wireless data may be transmitted, in accordance with one or more implementations of the present disclosure. The environment 100 illustrates an access point (AP) 110, a first device 120, a second device 130, and a third device 140.

Figure 6:
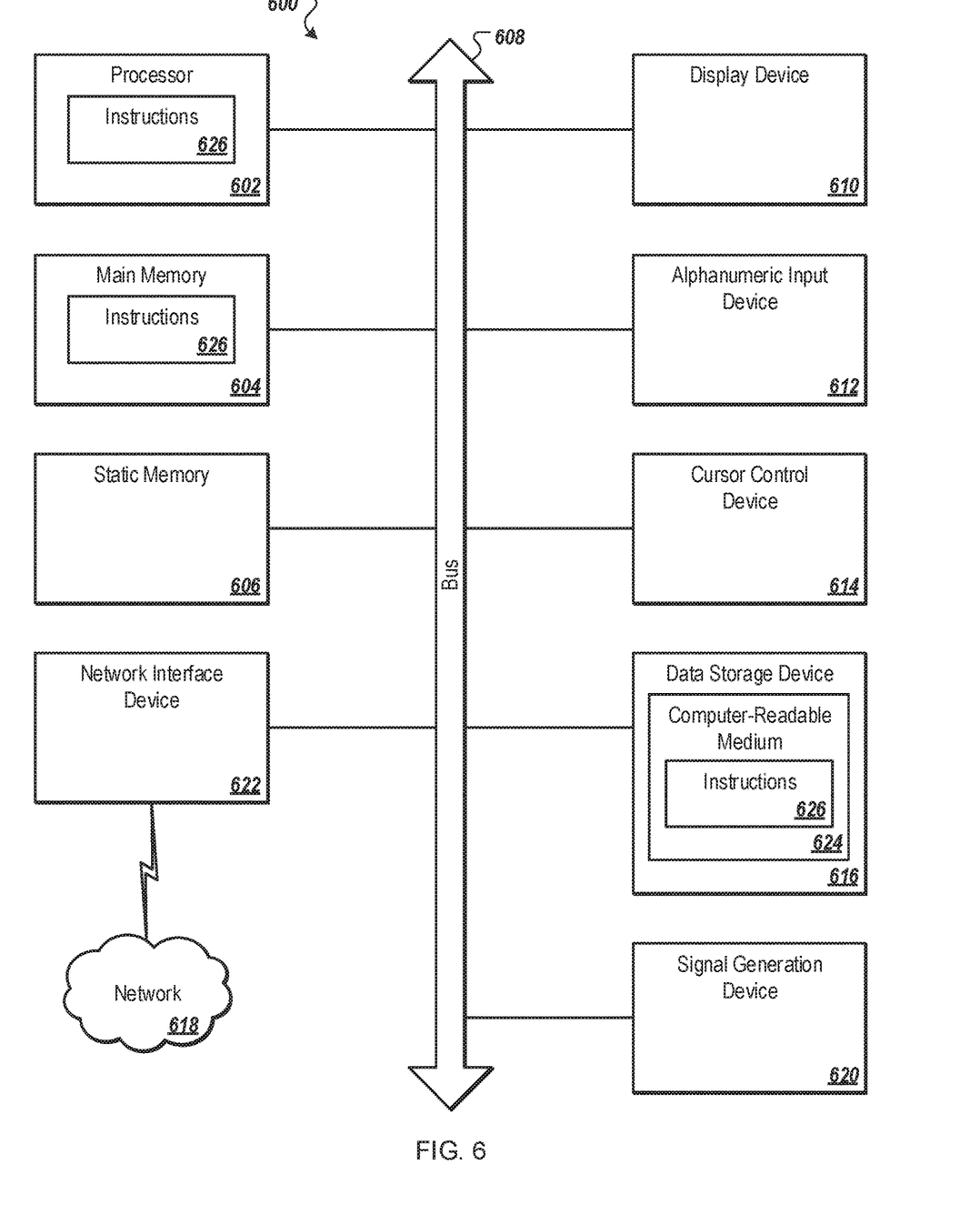
FIG. 6 illustrates a diagrammatic representation of a machine in the example form of a computing device.

In some implementations, the AP 110 may include a gateway, a repeater, a mesh node, and/or any other suitable device configured to host or control access to a wireless local area networks (WLAN). The WLAN may be implemented using any of the 802.11 protocols or other suitable wireless standard or protocol. One example implementation of the AP 110 as a computing device is illustrated in FIG. 6.

Each of the devices 120, 130, and 140 may generally include any device that is configured to access a WLAN, such as the WLAN hosted by the AP 110 or an internet of things local area network. Each of the devices 120, 130, and 140 may include a desktop computer, a laptop computer, a tablet computer, a mobile phone, a smartphone, a personal digital assistant (PDA), a smart device or appliance, an automobile or other type of personal vehicle, or any other suitable wireless station. One example implementation of one of the devices 120, 130, and 140 as a computing device is also illustrated in FIG. 6.

In some implementations, the AP 110 may connect to a separate network, such as the Internet and/or a core network via a bridge, a backhaul link, a base station, and/or other suitable devices or connections. The AP 110 may be configured to allow the devices 120, 130, and 140 to access the separate network via the WLAN.

The WLAN of the environment 100 may include a particular protocol to which the AP 110 and the devices 120, 130, and 140 may adhere. For example, a particular protocol may allow the AP 110 to request uplink data from the devices 120, 130, and 140. In these and other implementations, the AP 110 may transmit a request frame, such as a trigger frame in the 802.11ax protocol, to the devices 120, 130, and 140. The request frame may indicate from which of the devices 120, 130, and 140 the AP 110 may be requesting uplink data. For example, the AP 110 may transmit a request frame that indicates that the first device 120 and the second device 130 may transmit uplink data to the AP 110. Each of the first device 120 and the second device 130 may respond to the request frame with a response frame that includes data for uploading to the AP 110. For example, the response frame may be a trigger based (TB)-PPDU frame in the 802.11ax protocol. In these and other implementations, the third device 140 may not transmit a response frame to the AP 110, even if the third device 140 may include data to upload to the AP 110 because the request frame did not request data from the third device 140.

In some implementations, the particular protocol may indicate a timing requirement for when the devices 120, 130, and 140 may transmit the response frame. The timing requirement may indicate that transmission of the response frame begins after a particular amount of time elapses from the end of the receipt of the request frame. For example, the timing requirement may indicate that the devices 120, 130, and 140 begin transmission of a response frame a particular number of microseconds after a last symbol of the request frame is received by the devices 120, 130, and 140.

In some implementations, the devices 120, 130, and 140 may perform one or more operations to allow the devices 120, 130, and 140 to transmit a response frame according to a timing requirement of a protocol in response to a request frame. For example, the device 120 may include hardware 122 that may be configured to perform the operations.

In some implementations, an operation to allow the devices 120, 130, and 140 to transmit a response frame according to a timing requirement of a protocol in response to a request frame may include the devices 120, 130, and 140 processing a request frame before reception of the entire request frame. For example, the hardware 122 of the first device 120 may parse the request frame to extract information to configure a response frame. Alternately or additionally, software of the first device 120 may parse the request frame Alternately or additionally, the information exacted from the response frame may be used to determine a transmission start time for the response frame.

In some implementations, an operation to allow the devices 120, 130, and 140 to transmit a response frame according to a timing requirement of a protocol in response to a request frame may include the devices 120, 130, and 140 constructing a preliminary response frame before receiving a request frame and/or before the request frame is completely received and checked. For example, the first device 120 may include data to upload to the AP 110. The first device 120 may construct sub-frames of the data that may be aggregated together by the hardware 122 as a preliminary response frame. The hardware 122 may adjust the preliminary response frame based on information from the request frame to construct a finalized response frame for transmitting to the AP 110 at the transmission start time. In these and other implementations, adjusting the preliminary response frame may include removing one or more sub-frames of the data that formed the preliminary response frame. A number of the sub-frames removed from the preliminary response frame may be based on information obtained from the request frame.

In some implementations, an operation to allow the devices 120, 130, and 140 to transmit a response frame according to a timing requirement of a protocol in response to a request frame may further include the devices 120, 130, and 140 preparing a header portion of the response frame before the transmission start time without having a data portion of the response frame finalized for transmission. In these and other implementations, the devices 120, 130, and 140 may begin transmitting the header portion of the response frame. While the header portion of the response frame is being transmitting, the devices 120, 130, and 140 may finalize construction of the data portion of the response frame. As a result, the transmission of the header portion of the response frame and the construction of the data portion of the response frame may occur (e.g., in parallel, simultaneously, etc.) during the same time interval. Construction of the data portion of the response frame may be finalized before all of the header portion of the response frame is transmitted. After transmission of the header portion of the response frame, the finalized data portion of the response frame may be transmitted.

As described in the disclosure, the devices 120, 130, and 140 may perform any of multiple operations to allow the devices 120, 130, and 140 to transmit a response frame according to a timing requirement of a protocol in response to a request frame. In some implementations, the devices 120, 130, and 140 may perform any combination of the operations. Alternately or additionally, one of the devices 120, 130, and 140 may perform some of the operations and others of the devices may perform others of the operations.

In some implementations, the devices 120, 130, and 140 may perform one or more of the operations but not in response to receiving a request frame (e.g., independent of a trigger). Alternately or additionally, the devices 120, 130, and 140 may perform one or more of the operations but not in response to meeting a timing requirement of a protocol (e.g., independent of a timing requirement). In these and other implementations, the devices 120, 130, and 140 may perform the operations for any reason.

Modifications, additions, or omissions may be made to the environment 100 without departing from the scope of the present disclosure. For example, the environment 100 may include any number of other elements or may be implemented within other systems or contexts than those described. For example, any number of APs 110 and/or devices 120, 130, and/or 140 may be included.

Figure 2:
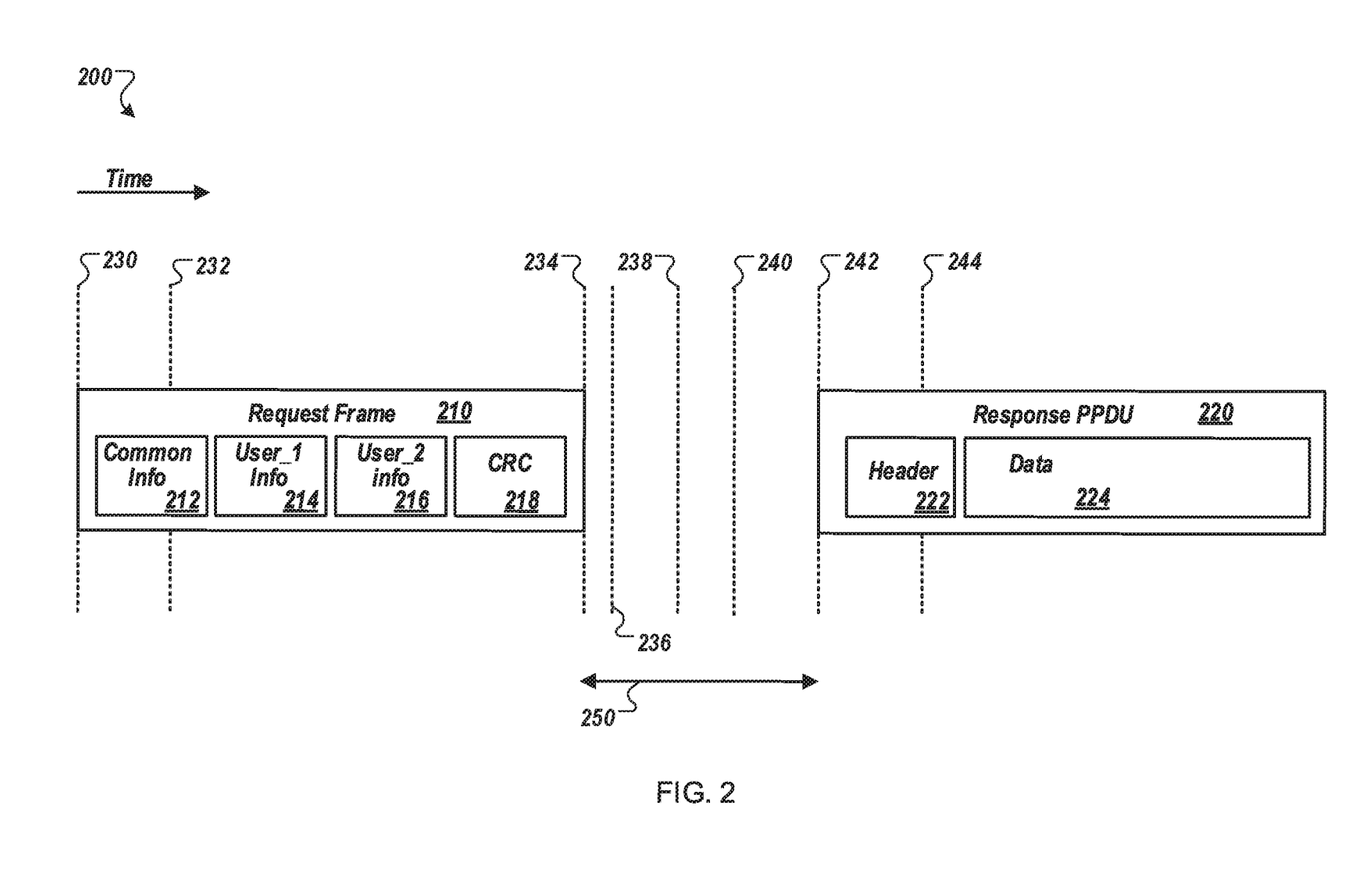
FIG. 2 illustrates an example timing diagram for constructing and transmitting a frame over a wireless network.

FIG. 2 illustrates an example timing diagram 200 for constructing and transmitting a frame over a wireless network, in accordance with one or more implementations of the present disclosure.

The timing diagram 200 may be a timing diagram that illustrates operations that may occur at a device during wireless communication between an AP, such as the AP 110 of FIG. 1 and the device, such as the device 120 of FIG. 1. The timing diagram 200 may not illustrate all operations that may be performed by the device nor are the operations limited to being performed in the order illustrated in the timing diagram 200. Additionally, the relationship between the different times in the timing diagram 200 are illustrative and not meant to connote a specific amount of time.

In general, the timing diagram 200 may illustrate a request frame 210 that may be received by a device after being transmitted by an AP. The request frame 210 may request that the device transmit uplink data from the device to the AP in a response PPDU 220.

At time 230, the request frame 210 may begin to be received at the device. The request frame 210 may be composed of multiple symbols that may be transmitted over a wireless medium from the AP. The symbols may be sequentially transmitted, by a requestor (e.g., AP), starting from an initial symbol to a last symbol. At time 230, the initial symbol of the request frame 210 may be received by the device. At time 234, the last symbol of the request frame 210 may be received by the device. The number of symbols in the request frame 210 may vary based on an amount of data in the request frame 210 and amount of data in each symbol, among other factors. In some implementations, the request frame 210 may be an example of a trigger frame from the 802.11ax protocol.

The request frame 210 may include multiple different types of information. For example, the request frame 210 may include common information 212, first user information 214, second user information 216, and cyclic redundancy check information (CRC) 218, among other information.

The common information 212 may include information indicating that the request frame 210 is a request from the AP for transmitting uplink data from the device. The common information 212 may also include other information such as a transmission power for the response PPDU 220 and a length of the response PPDU 220, among other information, such as physical parameters used for transmission of the response PPDU 220.

The first user information 214 may indicate a first device that is authorized to transmit uplink data to the AP in response to the request frame 210. The first user information 214 may additionally include specific transmission parameters for the first device to use when transmitting uplink data to the AP. For example, the specific transmission parameters may include transmission frequency, bandwidth, resource blocks, among other transmission parameters.

The second user information 216 may indicate a second device that is authorized to transmit uplink data to the AP in response to the request frame 210. The second user information 216 may include information analogous to the first user information 214 but unique to the second device. FIG. 2 illustrates the request frame 210 include first user information 214 and second user information 216. However, the request frame 210 may include information for more than two devices. The CRC 218 may include information that allows the device to check that the request frame 210 is accurately received using a cyclic redundancy check.

At time 232, the device may determine that the request frame 210 received at time 230 is a request frame. In some implementations, in response to determining that the request frame 210 is a request frame, the device may begin to parse the symbols of the request frame 210 that have been received. For example, the device may begin to parse the common information 212. The device may begin parsing the received symbols of the request frame 210 before the last symbol of the request frame 210 has been received at time 234. In some implementations, parsing the received symbols of the request frame 210 as the symbols are received may allow the device to obtain information in the request frame 210 before all of the symbols of the request frame 210 are received, before all processing of every symbol of the request frame 210 has been completed, and/or a cyclic redundancy check using the CRC 218 has been performed for the request frame 210. In these and other implementations, the processing of the request frame 210 may include equalization, demodulation, and filtering among other processing performed on wirelessly transmitted data.

By parsing the received symbols of the request frame 210 as the symbols are received, the device may obtain information regarding a length of the request frame 210. Based on the length of the request frame 210 and the request frame 210 being received at time 230, the device may calculate when a last symbol of the request frame 210 may be received before the last symbol of the request frame 210 is received. For example, the device may calculate that at time 234 a last symbol of the request frame 210 may be received.

By calculating the time 234, the device may also calculate a transmission start time for the response PPDU 220 before the last symbol of the request frame 210 is received. For example, the device may include timing requirement information that may indicate that transmission of a response frame may start a set amount of time after reception of a last symbol of a request frame. The set amount of time may be referred to as an interframe time period. As an example, the interframe time period may range between one to one-hundred microseconds, however, the interframe time period may vary based on a wireless protocol being implemented. In these and other implementations, the transmission start time of a response frame may be calculated by adding the interframe time period to the time when the last symbol of a request frame is received. In FIG. 2, the interframe time period is illustrated as 250. As such the transmission start time occurs at time 242 which is the interframe time period 250 after the time 234 when the last symbol of the request frame 210 is received.

In some implementations, based on the calculated transmission start time, the device may set a timer that may expire at the transmission start time to indicate when transmission of the response PPDU 220 is to begin.

At time 236, the device may perform a cyclic redundancy check of the request frame 210 using the CRC 218. In response to the cyclic redundancy check indicating that the request frame 210 is not properly received by the device, the device may take no further action with respect to the request frame 210. In response to the cyclic redundancy check indicating that the request frame 210 is properly received by the device, the device may determine if the request frame 210 requests that the device transmit uplink data. In response to the request frame 210 not indicating that the device transmit uplink data, the device may take no further action with respect to the request frame 210. In response to the request frame 210 indicating that the device transmit uplink data, the device may construct the response PPDU 220. The device may construct the response PPDU 220 using information from the request frame 210 and uplink data obtained by the device. For example, the device may construct a header portion 222 using information from the common information 212 and/or one of the first user information 214 and second user information 216 along with other information from the request frame 210. The device may also construct a data portion 224 using the uplink data.

At time 238, processing of the request frame 210 may be completed. Note that parsing of the request frame 210 and construction of the response PPDU 220 may occur before time 238. At time 240, the construction of the header portion 222 may be finalized. The construction of the data portion 224 may continue after the time 240.

At time 242, the header portion 222 of the response PPDU 220 may begin being transmitted by the device. In some implementations, the header portion 222 may be transmitted in response to the timer expiring that is set based on the calculated transmission start time. The construction of the data portion 224 may continue after the header portion 222 begins transmission. At time 244, the construction of the data portion 224 may be finalized. After the header portion 222 is transmitted, the data portion 224 may be transmitted by the device.

In some implementations, the construction of one or both of the header portion 222 and the data portion 224 may begin before the time 238. For example, construction of one or both of the header portion 222 and the data portion 224 may be begin at any time between the time 232 and the time 238 and/or in response to any type of information being parsed from the request frame 210. In these and other implementations, the header portion 222 may be constructed with information as the information is parsed from the request frame 210. For example, the header portion 222 may be constructed in response to parsing information from the common information 212 and/or information from one of the first user information 214 or the second user information 216. As another example, the data portion 224 may be constructed in response to parsing information in the request frame 210 regarding a length of the response PPDU 220.

In some implementations, the construction of one or both of the header portion 222 and the data portion 224 may begin before the time 230. In these and other implementations, the device may construct a preliminary header portion and/or a preliminary data portion. In response to receiving the request frame 210, the device may adjust the preliminary header portion and the preliminary data portion to construct the header portion 222 and the data portion 224.

The construction of the header portion 222 based on the preliminary header portion may occur during some period between the time 232 and the time 240 and/or in response to any type of information being parsed from the request frame 210. The preliminary header portion may include one or more information fields that may include information from the device. The header portion 222 may be constructed using the preliminary header portion by populating the header portion 222 with additional information from the request frame 210, such as physical parameters for transmission. The preliminary header portion may be populated with information from the request frame 210 in response to the information being parsed and before the time 236. The construction of the header portion 222 may conclude before the time 236, the time 238, or the time 240.

The construction of the data portion 224 based on the preliminary data portion may occur during some period between the time 232 and the time 244 and/or in response to any type of information being parsed from the request frame 210. For example, the data portion 224 may be constructed based on the preliminary data portion in response to the device parsing information from the request frame 210 regarding a length of the response PPDU 220. The length of the response PPDU 220 may be used to determine how much uplink data may be transmitted in the response PPDU 220.

The device may construct the preliminary data portion by formatting uplink data at the device for transmission before the time 230. For example, the device may format the uplink data into uplink data frames in memory that may be chained together to a form a multiple uplink data frame chain. For example, the multiple uplink data frame chain may include one or more MAC protocol data units (MPDU) in some 802.11 protocols. The device may construct a preliminary data portion of a particular length such that a response frame constructed from the preliminary data portion would be longer in length than the length indicated in the request frame 210. In these and other implementations, the device may adjust the preliminary data portion formed of multiple uplink data frames to form the data portion 224. Adjusting the preliminary data portion may include removing one or more uplink data frames from the preliminary data portion. In some implementations, the device may continue to construct the data portion 224 after the time 242.

In some implementations, padding may be added between the different uplink data frames in the uplink data frame chain. For example, padding may be added between each of multiple MPDUs. In these and other embodiments, each of the MPDUs may include a CRC field. Alternately or additionally, padding may be added to the end of the data portion 224 and a CRC field may be added after the padding. In some implementations, a CRC field may be added after the data portion 224 with the response PPDU 220 not including any padding.

Modifications, additions, or omissions may be made to the timing diagram 200 without departing from the scope of the present disclosure. For example, the timing diagram 200 may include multiple other operations. Alternately or additionally, one or more of the operations may occur at different times. For example, the cyclic redundancy check of the request frame 210 may occur after the time 238. Additionally, any combination of software and/or hardware of a device may be used to perform the operations discussed with respect to the timing diagram 200.

Figure 3A:
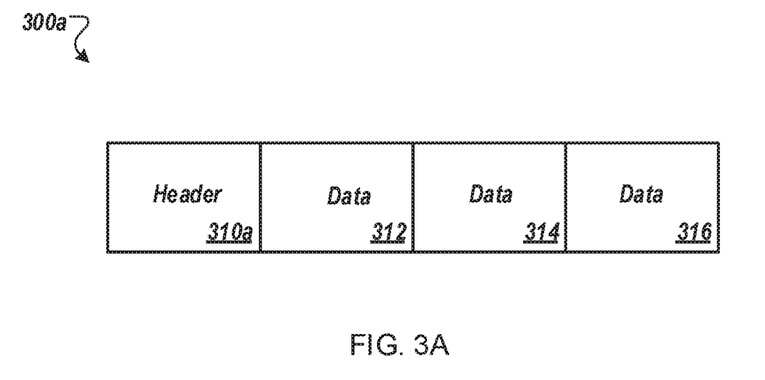
FIG. 3A illustrates an example preliminary response PPDU.

FIG. 3A illustrates an example preliminary response PPDU 300a, in accordance with one or more implementations of the present disclosure. The preliminary response PPDU 300a may include a preliminary header portion 310a, a first data portion 312, a second data portion 314, and a third data portion 316. Each of the data portions may be an uplink data frame and the data portions may be chained together. The preliminary response frame 300a may be constructed by a device before the device receives a request frame.

Figure 3B:
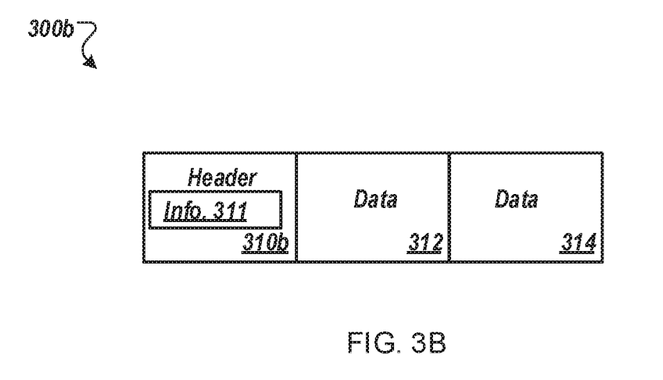
FIG. 3B illustrates an example finalized response PPDU.

FIG. 3B illustrates an example finalized response PPDU 300b, in accordance with one or more implementations of the present disclosure. The finalized response PPDU 300b may include a header portion 310b that may analogous to the preliminary header portion 310a but may also include information 311 that may be obtained from a request frame. The finalized response PPDU 300b may also include the first data portion 312 and the second data portion 314. However, the finalized response PPDU 300b may not include the third data portion 316. The third data portion 316 may be removed from the preliminary response frame 300a during construction of the finalized response PPDU 300b based on a length of the preliminary response PPDU 300a being longer than a length indicated by the request frame.

Modifications, additions, or omissions may be made to the response PPDU 300 without departing from the scope of the present disclosure. For example, the response PPDU 300 may include more than two or three data portions, CRC fields, and/or padding.

Figure 4:
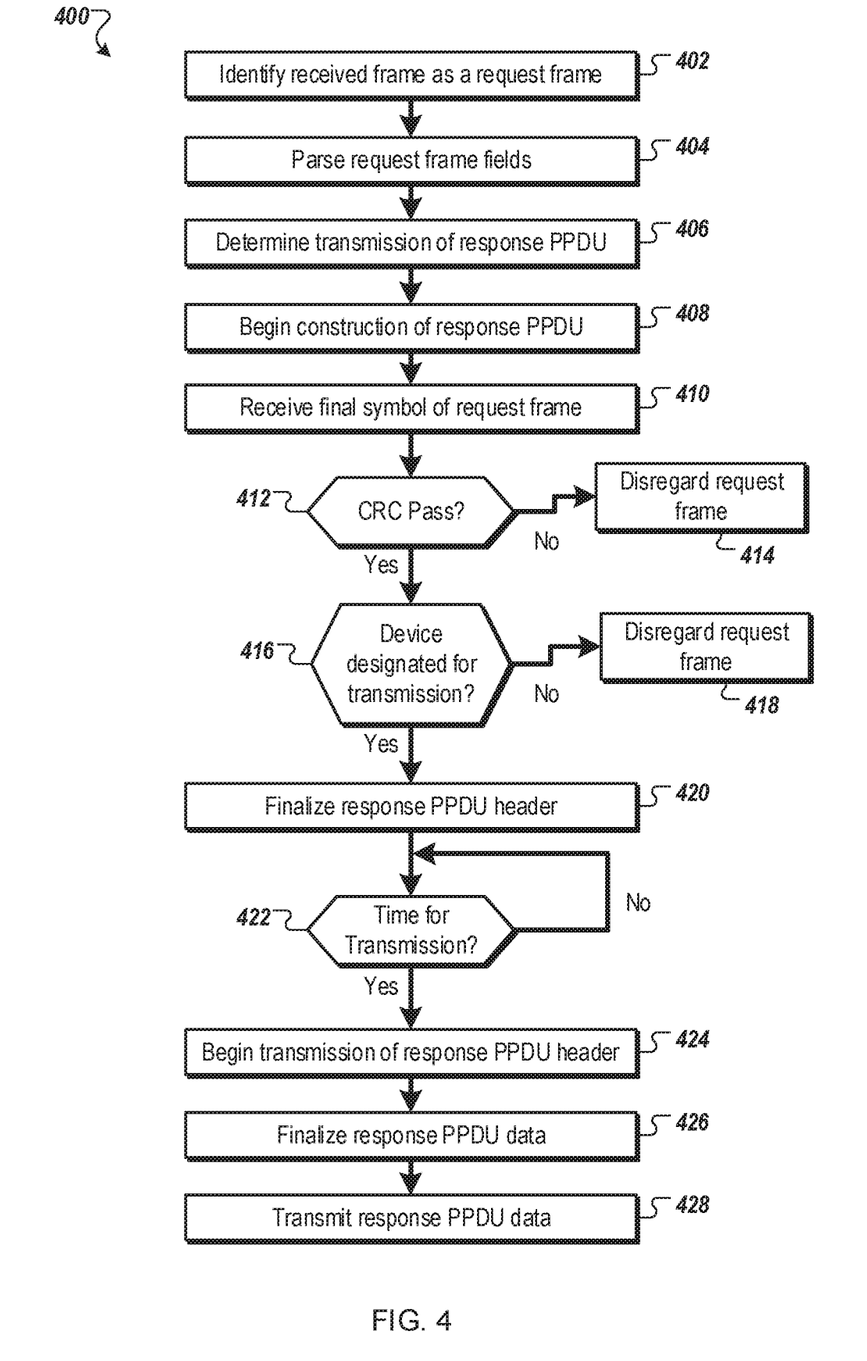
FIG. 4 illustrates a flowchart of an example method to prepare frames for transmission over a wireless network.

FIG. 4 illustrates a flowchart of an example method 400 to prepare frames for transmission over a wireless network, in accordance with one or more implementations of the present disclosure. The method 400 may be implemented, in whole or in part, by one or more of the devices 120, 130, and 140 of FIG. 1.

At block 402, a device may identify a received frame as a request frame from an AP. The request frame may be a request for the device to transmit uplink data to the AP in a response PPDU. In some implementations, hardware of the device, such as baseband or media access control (MAC) hardware, may assert a software interrupt to notify software running on the device that a request frame has been received.

At block 404, the device may begin to parse fields of the request frame. In some implementations, the software may begin parsing fields of the request frame in response to the software interrupt. The software may parse fields of the request frame as symbols of the request frame are continuing to be received and processed by the device. By parsing the fields of the request frame, the device may obtain information for the response PPDU. For example, the information may include physical parameters used in a header portion of the request frame.

At block 406, the device may determine a transmission time for the response PPDU. The transmission time for the response PPDU may be determined in response to obtaining information regarding a length of the request frame by the software of the device. The transmission time for the response PPDU may be calculated before a last symbol of the response PPDU is received by the device. The transmission time may be calculated using a received time of a first symbol of the request frame, a length of the request frame, and an interframe time period associated with the wireless protocols used for wireless transmission of the response PPDU. The interframe time period may indicate a time for beginning transmission of the response PPDU after the last symbol of the request frame is received. The device may set a timer to expire at the transmission time by the software of the device.

At block 408, the device may begin construction of the response PPDU. The construction may begin before the final symbol of the request frame is received. The device may use information parsed from the request frame before the final symbol of the request frame is received to construct a header portion of the response PPDU. In some implementations, the construction of the response PPDU may be based on a preliminary response PPDU constructed before the request frame is received by the device. In these and other implementations, the construction of the response PPDU may include adjusting the preliminary response PPDU. For example, a header portion of the preliminary response PPDU may be adjusted to include information from the request frame. As another example, one or more of multiple uplink data frames chained together to form a preliminary data portion of the preliminary response PPDU may be removed during construction of a data portion of the response PPDU. The response PPDU may be constructed by software of the device.

At block 410, the device may receive the final symbol of the request frame. In response to receiving the final symbol of the request frame, the device may perform a CRC check using CRC information from the request frame.

At block 412, the device may determine if the CRC check of the request frame passes. In these and other implementations, hardware of the device may assert a software interrupt to indicate to the software of the device the result of the CRC. In response to the CRC check passing, the method 400 may proceed to block 416. In response to the CRC check not passing, the method 400 may proceed to block 414.

At block 414, the device may disregard the request frame. Disregarding the request frame may include the device not taking further action with respect to the request frame. For example, the software of the device may stop preparing the response PPDU for transmission.

At block 416, the device may determine if the device is designated for transmission of a response PPDU based on information from the request frame. For example, the request frame may designate the device or may designate random-access resource units that may be used by the device. If the device is designated or random-access resource units are designated, the device may be determined to be designated. In response to the device being designated, the method 400 may proceed to block 420. In response to the device not being designated, the method 400 may proceed to block 418.

At block 418, the device may disregard the request frame. At block 420, the device may finalize the header portion of the response PPDU. The data portion of the response PPDU may not be finalized.

At block 422, the device may determine if the present is time for transmission of the header portion of the response PPDU based on the timer. In response to the timer expiring, the method may proceed to block 424.

At block 424, device may begin transmission of the header portion of the response PPDU. The transmission of the header portion may include the transmission of multiple symbols.

At block 426, the device may finalize construction of the data portion of the response PPDU. The construction of the data portion may have begun before transmission of the header portion of the response PPDU and may be finalized after the transmission of the response PPDU begins. In some implementations, the construction of the data portion of the response PPDU may be finalized during transmission of initial training fields of the header portion. In some implementations, the construction of the data portion may be finalized before high efficiency training fields of the header portion are transmitted.

At block 428, after the header of the response PPDU is transmitted, the data portion of the response PPDU may be transmitted. Alternately or additionally, CRC fields and/or optionally padding may also be transmitted.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations. For example, the block 408 may occur before the block 406. Alternately or additionally, the block 408 may occur after the block 416 in response to the device being designated for transmission. Additionally, the method 400 is described with respect to hardware and/or software performing various functions. However, any combination of software or hardware may perform the various functions described with respect to the method 400.

Figure 5:
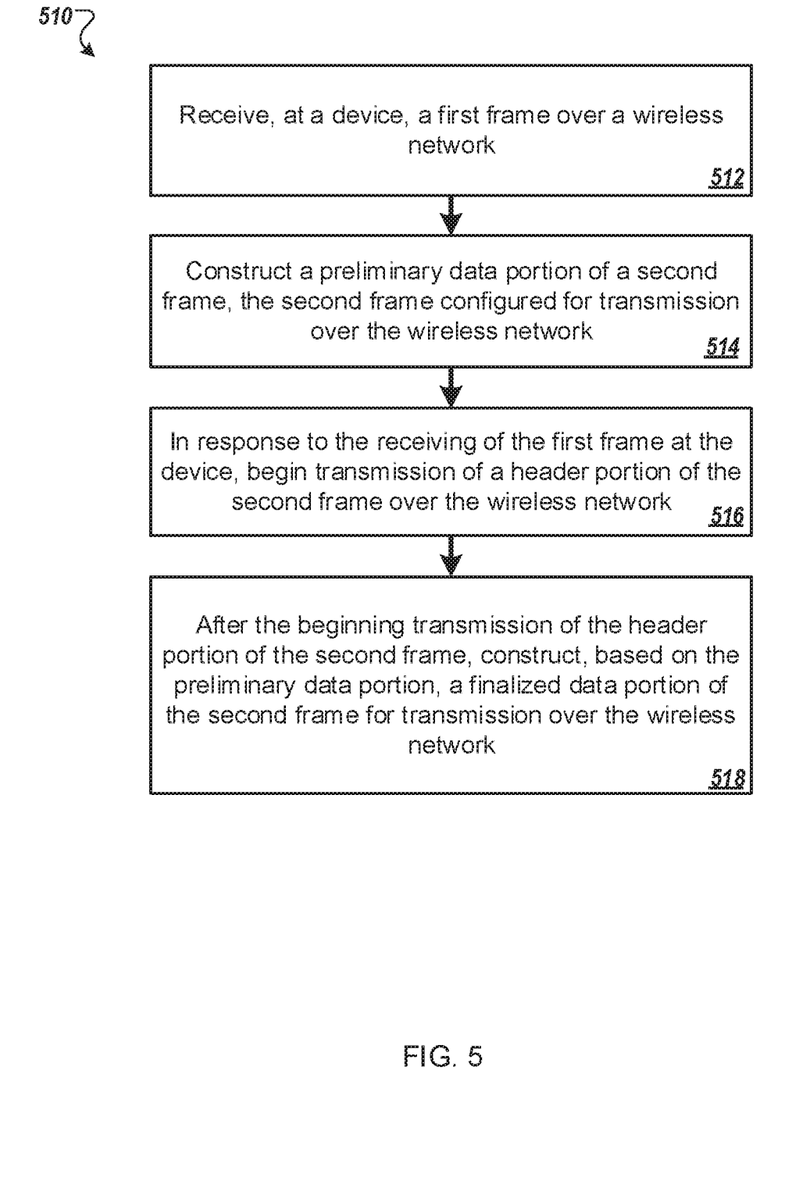
FIG. 5 illustrates a flowchart of an example method of wireless data transmission.

FIG. 5 illustrates a flowchart of an example method 510 of wireless data transmission, in accordance with one or more implementations of the present disclosure. The method 510 may be implemented, in whole or in part, by one or more of the devices 120, 130, and 140 of FIG. 1.

At block 512, a first frame may be received at a device over a wireless network.

At block 514, a preliminary data portion of a second frame may be constructed. The second frame may be configured for transmission over the wireless network. In some implementations, the first frame may include a beginning symbol that is received at a first of the first frame. In these and other implementations, the construction of the preliminary data portion of the second frame may begin before the beginning symbol of the first frame is received by the device.

In some implementations, the construction of the finalized data portion of the second frame may being before the beginning transmission of the header portion of the second frame and continues after the beginning transmission of the header portion of the second frame.

At block 516, in response to the receiving of the first frame at the device transmission of a header portion of the second frame may begin over the wireless network. In some implementations, the first frame may be a trigger frame transmitted by a wireless access point and the second frame may be a physical layer protocol data unit frame or a PPDU response.

At block 518, after the beginning transmission of the header portion of the second frame a finalized data portion of the second frame may be constructed based on the preliminary data portion for transmission over the wireless network. In some implementations, the constructing the finalized data portion of the second frame may include removing data from the preliminary data portion.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

For example, the method 510 may further include obtaining information from the first frame before a cyclic redundancy check of the first frame and constructing the header portion of the second frame based on the information. In some implementations, the first frame may include a last symbol that is received at an end of the first frame. In these and other implementations, the method 510 may further include determining a transmission start time for the second frame before the last symbol of the first frame is received by the device, wherein the transmission of the header portion of the second frame begins at the transmission start time. Alternately or additionally, the first frame may include a length parameter extracted from the first frame before the last symbol of the first frame is received by the device and the transmission start time may be determined based on the length parameter.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include one or more network interface devices 622 which may communicate with one or more networks 618. The computing device 600 also may include a display device 610, an alphanumeric input device 612 (e.g., a keyboard), a cursor control device 614 (e.g., a mouse) and a signal generation device 620 (e.g., a speaker). In at least one implementation, the display device 610, the alphanumeric input device 612, and/or the cursor control device 614 may be combined into a single component or device.

The data storage device 616 may include a computer-readable storage medium 624 on which is stored one or more sets of instructions 626 embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 624 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding, or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber, or digital subscriber backbone connection to the Internet to support wireless communications, e.g. IEEE 802.11 compliant communications, on a Wireless Local Area Network (WLAN). The WIFI stage includes a baseband stage, and the analog front end (AFE) and Radio Frequency (RF) stages. In the baseband portion wireless communications transmitted to or received from each user/client/station are processed. The AFE and RF portion handles the up conversion on each of transmit paths of wireless transmissions initiated in the baseband. The RF portion also handles the down conversion of the signals received on the receive paths and passes them for further processing to the baseband.

An example apparatus can be a multiple-input multiple-output (MIMO) apparatus supporting as many as NxN discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A method of wireless data transmission may include receiving, at a device, a first frame over a wireless network, constructing a preliminary data portion of a second frame, the second frame configured for transmission over the wireless network, in response to the receiving of the first frame at the device, beginning transmission of a header portion of the second frame over the wireless network, and after the beginning transmission of the header portion of the second frame, constructing, based on the preliminary data portion, a finalized data portion of the second frame for transmission over the wireless network.

Example 2. A device including hardware configured to perform operations, the operations including: receive a first frame over a wireless network, construct a preliminary data portion of a second frame, the second frame configured for transmission over the wireless network; in response to the receiving of the first frame, begin transmission of a header portion of the second frame over the wireless network, and after the begin transmission of the header portion of the second frame, adjust the preliminary data portion to construct a finalized data portion of the second frame for transmission over the wireless network.

Example 3. A non-transitory computer readable media including instructions that when executed by a device, cause the device to perform operations, the operations including: receive a first frame over a wireless network; construct a preliminary data portion of a second frame, the second frame configured for transmission over the wireless network, in response to the receiving of the first frame at the device, begin transmission of a header portion of the second frame over the wireless network, and after the begin transmission of the header portion of the second frame, construct, based on the preliminary data portion, a finalized data portion of the second frame for transmission over the wireless network.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The present disclosure may be embodied in other specific forms without departing from its spirit or essential characteristics. The described implementations are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

What is claimed is:

1. A method of wireless data transmission, the method comprising:
   receiving, at a device, a first frame over a wireless network;
   constructing a preliminary data portion of a second frame, the second frame configured for transmission over the wireless network;
   in response to the receiving of the first frame at the device, beginning transmission of a header portion of the second frame over the wireless network; and
   after the beginning transmission of the header portion of the second frame, constructing, based on the preliminary data portion, a finalized data portion of the second frame for transmission over the wireless network.

2. The method of claim 1, wherein the first frame includes a beginning symbol that is received at a first of the first frame, wherein the construction of the preliminary data portion of the second frame begins before the beginning symbol of the first frame is received by the device.

3. The method of claim 1, wherein the construction of the finalized data portion of the second frame begins before the beginning transmission of the header portion of the second frame and continues after the beginning transmission of the header portion of the second frame.

4. The method of claim 1, further comprising:
   obtaining information from the first frame before a cyclic redundancy check of the first frame;
   constructing the header portion of the second frame based on the information.

5. The method of claim 1, wherein the constructing the finalized data portion of the second frame includes removing data from the preliminary data portion.

6. The method of claim 1, wherein the first frame includes a last symbol that is received at an end of the first frame and the method further comprises determining a transmission start time for the second frame before the last symbol of the first frame is received by the device, wherein the transmission of the header portion of the second frame begins at the transmission start time.

7. The method of claim 6, wherein the first frame includes a length parameter extracted from the first frame before the last symbol of the first frame is received by the device and the transmission start time is determined based on the length parameter.

8. The method of claim 1, wherein the first frame is a trigger frame transmitted by a wireless access point and the second frame is a physical layer protocol data unit frame.

9. A device comprising:
   hardware configured to perform operations, the operations comprising:
     receive a first frame over a wireless network;
     construct a preliminary data portion of a second frame, the second frame configured for transmission over the wireless network;
     in response to the receiving of the first frame, begin transmission of a header portion of the second frame over the wireless network; and
     after the begin transmission of the header portion of the second frame, adjust the preliminary data portion to construct a finalized data portion of the second frame for transmission over the wireless network.

10. The device of claim 9, wherein the first frame includes a beginning symbol that is received at a first of the first frame, wherein the construction of the preliminary data portion of the second frame begins before the beginning symbol of the first frame is received.

11. The device of claim 9, wherein the adjust the preliminary data portion begins before the begin transmission of the header portion of the second frame and continues after the transmission of the header portion of the second frame.

12. The device of claim 11, wherein the operations further comprise:
obtain information from the first frame before a cyclic redundancy check of the first frame; and
construct the header portion of the second frame based on the information.

13. The device of claim 9, wherein the adjust the preliminary data portion includes removing data from the preliminary data portion.

14. The device of claim 9, wherein the first frame includes a last symbol that is received at an end of the first frame and the operations further comprise determine a transmission start time for the second frame before the last symbol of the first frame is received by the device, wherein the transmission of the header portion of the second frame begins at the transmission start time.

15. The device of claim 14, wherein the first frame includes a length parameter extracted from the first frame before the last symbol of the first frame is received by the device and the transmission start time is determined based on the length parameter.

16. A non-transitory computer readable media including instructions that when executed by a device, cause the device to perform operations, the operations comprising:
receive a first frame over a wireless network;
construct a preliminary data portion of a second frame, the second frame configured for transmission over the wireless network;
in response to the receiving of the first frame at the device, begin transmission of a header portion of the second frame over the wireless network; and
after the begin transmission of the header portion of the second frame, construct, based on the preliminary data portion, a finalized data portion of the second frame for transmission over the wireless network.

17. The non-transitory computer readable media of claim 16, wherein the first frame includes a beginning symbol that is received at a first of the first frame, wherein the construction of the preliminary data portion of the second frame begins before the beginning symbol of the first frame is received by the device.

18. The non-transitory computer readable media of claim 16, wherein the construction of the finalized data portion of the second frame begins before the beginning transmission of the header portion of the second frame and continues after the beginning transmission of the header portion of the second frame.

19. The non-transitory computer readable media of claim 16, wherein the first frame includes a last symbol that is received at an end of the first frame and the operations further comprise determine a transmission start time for the second frame before the last symbol of the first frame is received by the device, wherein the begin transmission of the header portion of the second frame begins at the transmission start time.

20. The non-transitory computer readable media of claim 19, wherein the first frame includes a length parameter extracted from the first frame before the last symbol of the first frame is received by the device and the transmission start time is determined based on the length parameter.

* * * * *